June 17, 1958 H. CARLETON 2,839,749
PRECISION ELECTRONIC NAVIGATION SYSTEM
Filed July 8, 1952 6 Sheets-Sheet 5

INVENTOR
HENRY CARLETON
BY
ATTORNEYS

United States Patent Office 2,839,749
Patented June 17, 1958

2,839,749
PRECISION ELECTRONIC NAVIGATION SYSTEM

Henry Carleton, Silver Spring, Md.

Application July 8, 1952, Serial No. 297,794

9 Claims. (Cl. 343—105)

(Granted under Title 35, U. S. Code (1952), sec. 266)

The invention described herein may be manufactured and used by or for the Government of the United States of America for governmental purposes without the payment of any royalties thereon or therefor.

The present invention relates to a method and system for determining the position of a moving object and its path of movement; and more particularly, to a method and system for determining the orientation of a moving ship or airplane with respect to two or more distant fixed points by utilizing continuous frequency waves and the Doppler effect.

In general, precision navigation systems of this type involve the transmission of a radio frequency wave in both directions between a fixed observing station and a moving remote station. During transmission, the frequency of this transmitted radio wave is slightly changed due to the Doppler effect, which effect has been used to ascertain the speed, distance, and location of a moving object such as a ship. In general, a return signal from the ship, changed by the Doppler effect, is compared with the transmitted signal at an observing station as to phase. The difference in the generated radio wave at that station and the phase of the incoming return wave provides data wherein the distance between the fixed and the moving station may be determined.

In using a single frequency wave in a system of this type difficulties have been encountered in that the remote station has frequently been found to be unstable in receiving and then retransmitting a single frequency wave since the signals generated by the remote transmitter are picked up by its own receiver as feedback with the effect that the system tends to fall into an oscillatory state. To overcome this difficulty, navigation systems have been developed involving the transmission of a modulated carrier wave in which the modulated carrier wave is demodulated at the remote station and then remodulated and transmitted with a different frequency carrier wave. These systems, because of the modulation of the carrier waves, operate at relatively low frequencies which inherently have a long wave length, sometimes of an order of several miles. During the phase comparison of frequencies having wave lengths of this order, large inaccuracies in the distance data are incurred because of the difficulty of the phase-comparing apparatus to distinguish slight phase shifts in frequencies having such long wave lengths. Also, the receivers used in such a system must incorporate broad waveband tuned input circuits to accommodate the modulated carrier waves with their associated side bands, thereby rendering the apparatus more susceptible to interference and, further, requiring a greater band spread of the operating frequencies.

Accordingly, an object of the present invention is the provision of an improved method of and means for determining the position and the path of a moving object.

Another object is the provision of a navigation system utilizing Doppler's principle and a plurality of unmodulated continuous waves to indicate the distance between two remote stations.

A further object of the invention is the provision of a navigation system by which the distance between a fixed and a moving point may be continuously and directly furnished.

Still another object is the provision of a navigation system of a type described which employs a minimum of components and which is simple in operation and yet highly accurate.

Other objects will become apparent during the course of the following descriptions of illustrative embodiments of the invention and from the appended claims.

According to the principle features of the invention, a continuous wave navigation system is provided to locate accurately, a moving surface vessel or aircraft by measuring the distance between the moving unit and a plurality of fixed points. Knowing the distances, the position is determined by simple mathematical calculations. Accordingly, there are provided a plurality of widely separated fixed communication stations, preferably two, each of which is provided with a transmitting and/or receiving apparatus adapted to communicate with a remote mobile station also containing transmitting and receiving apparatus. A pair of high frequency continuous waves are generated and transmitted from one of said fixed stations to the other fixed station and to the mobile station. At the mobile station, the frequency waves are combined and retransmitted to each of the fixed stations where the original frequencies are combined and phase compared with the received frequency wave transmitted from the mobile station. The phase difference between the compared frequency waves indicates the distance between the mobile station and the respective fixed stations; by using phase meter indicators, these distances are read directly.

A better understanding of the invention and the objects and features thereof may be had from the particular description thereof made with reference to the accompanying drawings in which.

Figure 1:
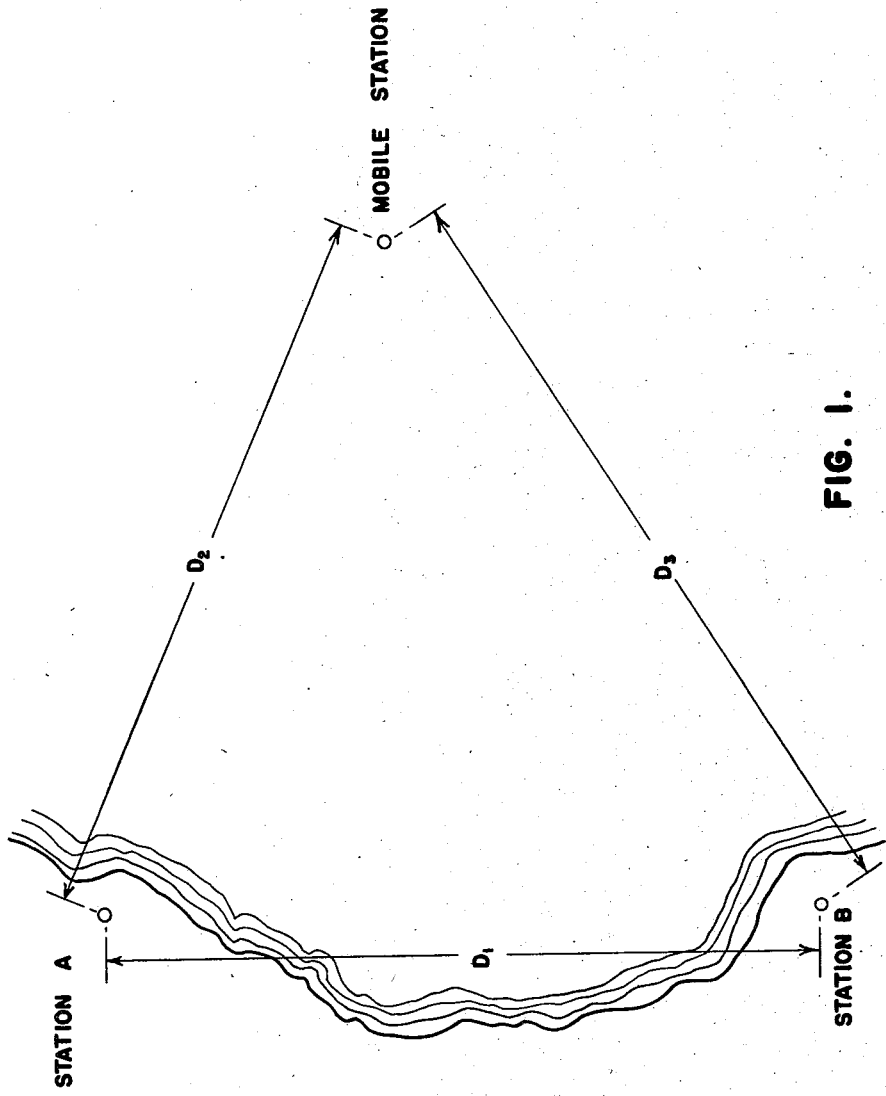
Fig. 1 is a diagram employed in explaining the general principles of the invention.

Referring now to the drawings wherein like reference characters designate like or corresponding parts throughout the several views, there is shown in Fig. 1 a pair of fixed stations A and B separated from each other by a distance $D_1$, each station of which is separated from a remote mobile station by unknown distances $D_2$ and $D_3$, respectively. The stations A and B and the mobile remote station are situated such that they locate the corners of a triangle in which the length of the side $D_1$ is known since the stations A and B are normally fixed and definitely located, and the sides $D_2$ and $D_3$ are unknown. In accordance with the invention, the sides $D_2$ and $D_3$ are continuously measured so that the three sides of the triangle are known or ascertainable. Accordingly, the angles of triangle and thus the specific position of the mobile station may be accurately determined from conventional trignometric formulae. By separately plotting the calculated positions of the mobile station as it moves, its path of movement can also be determined.

Figure 2:
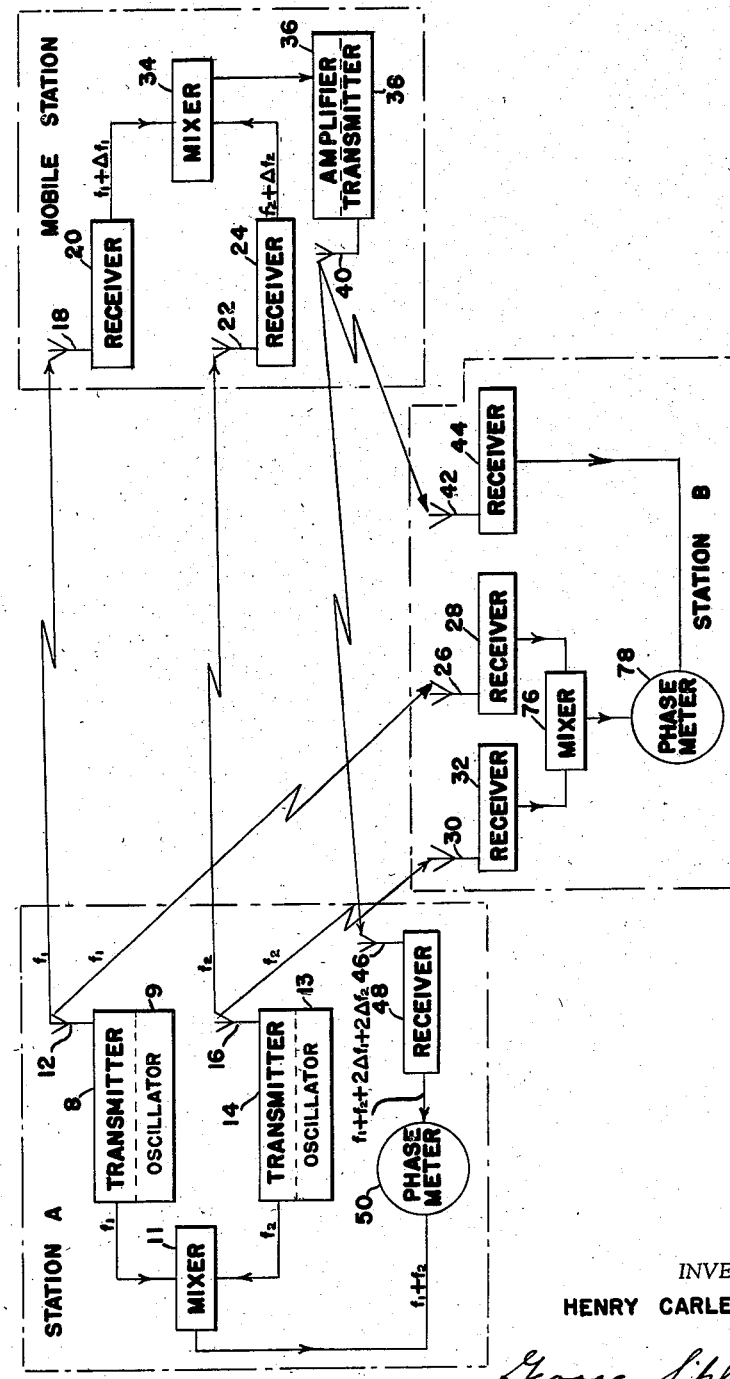
Fig. 2 is a block diagrammatic view of a preferred embodiment of the invention employing a pair of fixed stations for obtaining simultaneous distance indications of a mobile station through the use of continuous frequency waves.

Now referring to Fig. 2, one of the stations A is shown as comprising a pair of transmitters 8, 14, a mixer 11, a receiver 48 and a phase meter 50. The transmitter 8 includes a constant frequency oscillator 9, preferably of the "crystal" oscillator type to generate a first high frequency continuous wave $f_1$. In an oscillator of this type, a piezoelectric crystal is utilized to control the radiant energy at a constant and stable frequency. The transmitter may also include a buffer amplifier in series with the oscillator to amplify the signal frequency and also to act as an isolating stage between the oscillator 9 and a power amplifier included within the transmitter to prevent any disturbing effects upon the oscillator by the power amplifier. The power amplifier, which is coupled to the buffer amplifier by suitable coupling means such as an inductor circuit, is provided with a transmitting antenna 12 in its output circuit whereby the amplified signal frequency is radiated into space as radiant energy.

A second transmitter 14, similar in construction to the transmitter 8, includes a constant frequency local oscillator 13, preferably of the crystal type, and may also include a buffer amplifier stage and a power amplifier. The oscillator 13 generates a second high frequency continuous wave $f_2$ which is amplified in the transmitter 14 and radiated into space as radiant energy by antenna 16. During the transmission of the signal frequencies from transmitters 8 and 14, a portion of the continuous wave frequencies $f_1$ and $f_2$ are tapped from the output of the transmitters 8 and 14 and fed into the two inputs of a sum mixer 11. The sum mixer 11, consisting of a heterodyne circuit having a selective filter in the output circuit, combines the continuous wave frequencies $f_1$ and $f_2$ to produce in its output thereof a third continuous wave frequency $f_1+f_2$ equal to the sum of these frequencies, for reasons hereinafter explained. The sum mixer thus acts to heterodyne the two frequencies together and by means of the selective filter permits the desired frequency components $f_1+f_2$ to pass through the unit. The frequencies $f_1$ and $f_2$, radiated by the transmitters 8 and 14 through their respective antennae as radiant energy are picked up at a moving mobile station by the antennae 18 and 22 of highly selective receivers 20 and 24, tuned to receive the specific frequencies $f_1$ and $f_2$ respectively.

The tuned receivers 20 and 24 each consist of a radiant energy receiving antenna system coupled by way of an inductor to a selectively tuned, single or multi-stage, radio frequency amplifier of conventional design to receive and amplify the radiated frequency waves. The number of stages of amplification is determined by distance between units and the strength of the incoming signal. Although the receivers are disclosed as only including an antenna and an amplifier section, any suitable radio frequency amplifier of a receiver such as the well known "tuned radio frequency" and "superheterodyne" receivers may be used. The signal frequencies $f_1+\Delta f_1$ and $f_2+\Delta f_2$ received by the respective receivers 20 and 24 are slightly different from the originally transmitted frequencies $f_1$ and $f_2$ due to the Doppler effect occasioned by the relative movement of the mobile station with respect to the fixed station A. The component $\Delta f_1$ of the frequency wave received at 20, according to Doppler's principle, in cycles per second is equal to:

$$\Delta f_1 = \frac{V_1}{X_1} \qquad (1)$$

where $V_1$=velocity in ft. per sec. of the mobile unit with respect to station A; that is, on a straight line through the mobile station to the station A, where $V_1$ is plus, if the mobile unit is moving toward A, and minus if moving away from A, and $X_1$=wave length in feet of frequency $f_1$.

Similarly, the received frequency at the receiver 24 is $f_2+\Delta f_2$, where the $\Delta f_2$ component of the frequency wave is equal to:

$$\Delta f_2 = \frac{V_1}{X_2} \qquad (2)$$

where $X_2$=wavelength in feet of frequency $f_2$.

The amplified output signal frequency $f_1+\Delta f_1$ of receiver 20 and the amplified output signal frequency $f_2+\Delta f_2$ of receiver 24 are each fed into a separate input of a sum mixer 34, similar in construction to the sum mixer 11, wherein the two frequencies are combined and selected to produce in the output thereof a fourth sum frequency $f_1+f_2+\Delta f_1+\Delta f_2$. This output frequency is amplified in a suitable amplifier 36 and then radiated into space as radiant energy by means of a transmitter 38 and its associated antenna 40. Thus, the remote system operates to receive the two signal frequencies transmitted from transmitters 8 and 14, combines and amplifies the received frequencies, and then retransmits the resultant single frequency including the components due to the Doppler effect. This fourth continuous wave frequency is picked up at fixed stations A and B by antennae 42 and 46 of selectively tuned receivers 44 and 48 respectively. The receivers 44 and 48 may be similar in construction to the receivers 20 and 24 with the exception that the receivers 44 and 48 are selectively tuned to receive the single combined frequency signal radiated by the transmitter 38 of the mobile station.

At station A, the signal received by the receiver 48 through its antenna 46 and amplified in the receiver will have a frequency approximately equal to $f_1+f_2+2\Delta f_1+2\Delta f_2$, where the $\Delta f_1$ and $\Delta f_2$ values are doubled because the transmission from the mobile station to the fixed station A traverses the same path as frequencies $f_1$ and $f_2$ traversed in the original transmission to the mobile station. Actually, this frequency is not exactly $f_1+f_2+2\Delta f_1+2\Delta f_2$ but a slightly different frequency. The actual frequency should be computed by determining the Doppler frequency of $f_1+f_2+\Delta f_1+\Delta f_2$. However, the resultant difference is so slight that at speeds of the mobile station normally encountered, such as a ship or airplane, it may be neglected without any appreciable error in the final results.

The output frequency $f_1+f_2$ of sum mixer 11 and the amplified output frequency $f_1+f_1+2\Delta f_1+2\Delta f_2$ of the receiver 48 are each fed to a separate input of an integrating phase meter 50 of any suitable type. The integrating phase meter functions to indicate the time integral of the frequency difference of the two different frequency input voltages. The phase meter may be such that when a frequency difference or phase displacement of the two frequencies fed to the phase meter is one cycle per second, the phase meter will increase its value one unit for each second that the frequency difference remains one cycle per second. Preferably, the phase meter is constructed such that the indicator will make one complete revolution for each unit advanced and in which one revolution represents a 360° phase change whereby a one-degree phase change per second between the two frequency input signals will cause the indicator to make one complete revolution in 360 seconds.

Figure 6:
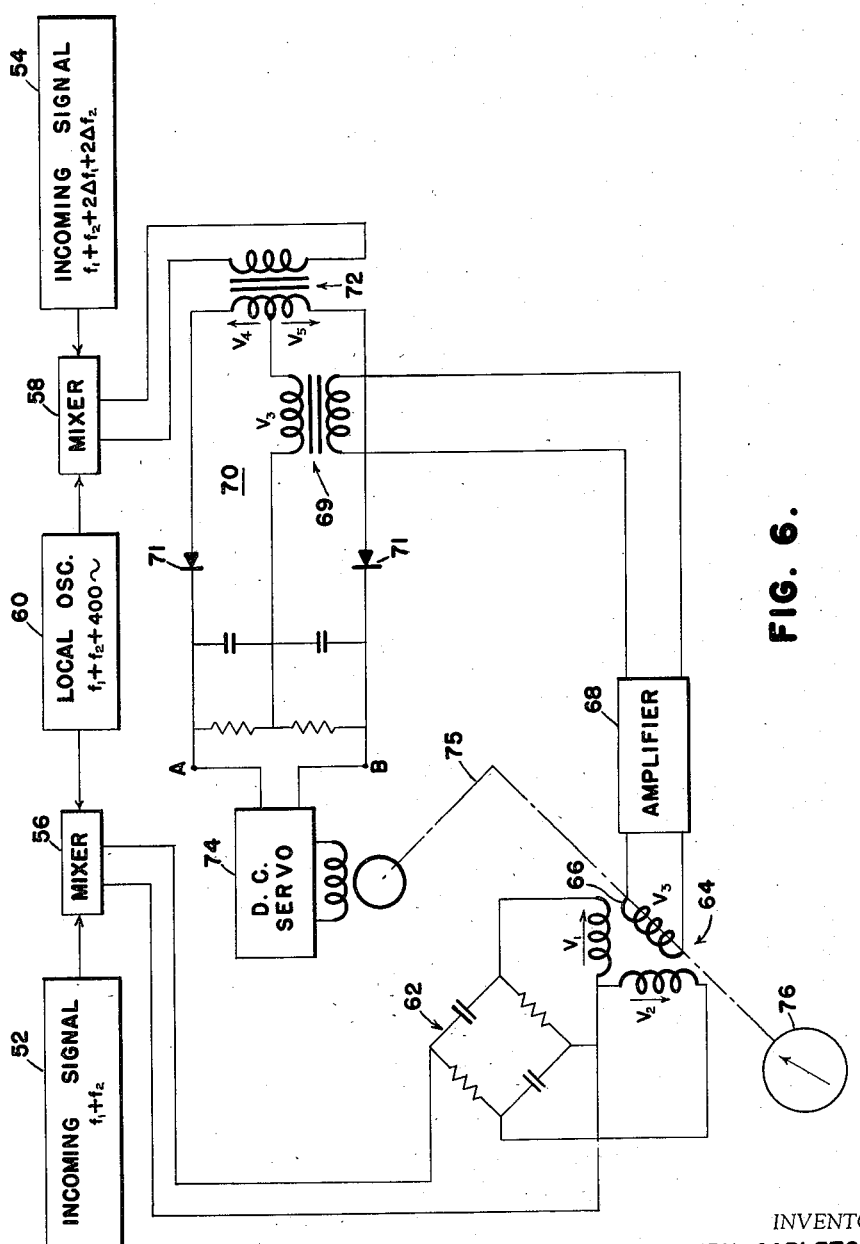
Fig. 6 is a view in schematic and block form of an integrating phase meter used in conjunction with the instant invention.

A phase meter adapted to perform this function is shown in simplified form in Fig. 6 wherein an incoming signal having a continuous frequency of $f_1+f_2$ and indicated by an input 52 can be phase compared with a second incoming signal having a continuous wave frequency of $f_1+f_2+2\Delta f_1+2\Delta f_2$ and indicated by an input 54. Briefly, the operation of the meter is as follows: Inputs 52 and 54 are each fed into one input of a pair of differential mixers 56 and 58 respectively. A local oscillator 60 of any suitable constant frequency type is provided to generate a continuous wave frequency of $f_1+f_2+400$ cycles. This generated frequency signal is applied to the second input of each of the differential mixers 56 and 58. The differential mixers are constructed such that any difference of the two frequency waves applied to its inputs will be produced in its output circuit and normally consists of a suitable heterodyning circuit including a selective filter which permits only the beat frequency to pass. Thus, an input voltage of a frequency $f_1+f_2$ applied to the mixer 56 from the input 52 and an input voltage of a frequency $f_1+f_2+400$ cycles applied from the local oscillator 60 will, by a heterodyne action, produce an output voltage having a frequency of 400 cycles. This output voltage from the mixer 56 is fed to a 90° network 62 the purpose of which is to generate a pair of voltages $V_1$ and $V_2$ having a phase displacement of 90° with respect to each other. The voltages $V_1$ and $V_2$ are then applied to a two phase servo mechanism of the self-synchronizing type. Upon application of the voltages $V_1$ and $V_2$ to the servo mechanism, which may be an Autosyn unit, this being a trade name of a synchro mechanism of this type, a voltage $V_3$ is induced in a single phase rotor 66 of the Autosyn. The rotor 66 is such that upon rotation thereof, the voltage $V_3$ induced therein will have its phase displacement varied from 0 to 360° with respect to the stator voltages $V_1$ and $V_2$. This voltage is amplified in an amplifier 68 and applied to the primary winding of a transformer 69 of a comparator circuit 70 which includes a filter circuit having one-way rectifiers 71.

An output voltage with a frequency of 400 cycles$+2\Delta f_1+2\Delta f_2$ derived from the mixer 58, is applied to a primary winding of a transformer 72 of the phase comparator circuit 70, the secondary winding of which is center tapped to induce therein a pair of voltages $V_4$ and $V_5$, displaced 180° with respect to each other. The secondary winding of the transformer 69 is interposed in the line of the center-tap of the secondary winding of the transformer 72 such that the voltages $V_4$ and $V_5$ induced in the secondary winding of transformer 72 will be compared as to phase with the voltage $V_3$ induced in the secondary winding of the transformer 69.

In the normal operation of the phase comparator 70, when the phase relationship between $V_3$ and $V_4$ and $V_3$ and $V_5$ is 90°, the output of the phase comparator circuit will be zero volts. However, when the phase relation differs such that the phase relationship between the voltages is either greater or lesser than 90°, an output voltage will be produced across points A B having a polarity determined by the phase relation difference. Thus, if the phase difference between $V_3$ and $V_4$ is 75° while the phase difference between $V_3$ and $V_5$ is 105°, then output terminals A and B of the comparator circuit 70 will have a voltage applied thereto with the terminal A having a positive potential with respect to terminal B. Should the phase relationship differ in that the phase relationship between the voltages $V_3$ and $V_4$ is greater than the phase relationship between the voltages $V_3$ and $V_5$, then the polarity of the terminals will be reversed. The output voltages from the phase comparator 70 are applied to a D. C. servo-mechanism 74 which will rotate at a speed proportional to the input voltage applied and in a direction dependent upon the polarity of the input voltage.

Mechanically connected by a linkage 75 with the servo-mechanism is the rotor 66 of the two phase servo-mechanism 64, and the dials of an indicator 76. Since the rotation of the rotor 66 will inherently change the phase relation of the voltage $V_3$, a continued rotation of the rotor 66 will eventually change the phase of the voltage $V_3$ such that its comparison with each of the voltages $V_4$ and $V_5$ will produce a 90° phase relation with respect to them. Upon reaching a 90° phase relation between each of the voltages, a null in the comparator circuit 70 will be produced. Thus, the two phase servo-mechanism 64, the phase comparator 70 and the D. C. servo-mechanism 74 provide, in effect, a rebalancing circuit. Hence, as the phase relation of voltages $V_4$ and $V_5$ change, the phase relation of the voltage $V_3$ will be changed accordingly by the rotation of the D. C. servo-mechanism 74 and the rotor 66 whereby the indicator 76 having a direct connection with the rotor 66 and the D. C. servo-mechanism 74 will become the indicator of the phase relation of $V_4$ and $V_5$.

At station A, the output frequency $f_1+f_2$ of the mixer 11 and the output frequency $f_1+f_2+2\Delta f_1+2\Delta f_2$ of the receiver 48, when fed into the two inputs of the phase meter 50, will produce an indication within the phase meter equal to the time integral of $2\Delta f_1+2\Delta f_2$. To express mathematically the phase angle indicated by the phase meter and the distance $D_2$ between the fixed station A and the mobile station, the reading of the phase meter 50 hereinafter indicated by $\phi_1$ is:

$$\phi_1 = \int(2\Delta f_1 + 2\Delta f_2)dt \qquad (3)$$

where $$\Delta f_1 = \frac{V_1}{X_1}$$

Equation 1 above, and $$\Delta f_2 = \frac{V_1}{X_2}$$

Equation 2 above.

Substituting (1) and (2) in (3) and rearranging, $$\phi = \frac{2}{X_1} + \frac{2}{X_2}\int V_1 dt \qquad (4)$$

Since $V_1$ is the velocity of the mobile station with respect to station A and $D_2$ is the distance of the mobile station from station A, then $$V_1 = \frac{dD_2}{dt} \qquad (5)$$

Substituting (5) into (4) and integrating:

$$\phi_1 = \left(\frac{2}{X_1} + \frac{2}{X_2}\right)D_2 \qquad (6)$$

Equation 6 shows that the reading of the phase meter $\phi_1$ is equal to the distance $D_2$ multiplied by a constant and that the velocity $V_1$ may vary in any manner without restriction.

This constant in terms of distance can be ascertained mathematically by defining $X_3$ as the wave length of a frequency equal to the sum of the two frequencies $f_1$ and $f_2$, then:

$$X_3 = \frac{c}{f_1+f_2}; \; \frac{1}{X_3} = \frac{f_1+f_2}{c} = \frac{f_1}{c} + \frac{f_2}{c} = \frac{1}{X_1} + \frac{1}{X_2} \qquad (7)$$

where $c$ is the velocity of light.

Substituting (7) into (6), we have:

$$\phi_1 = \frac{D_2}{X_3} + \frac{D_2}{X_3} = \frac{2D_2}{X_3}$$

Thus, the phase meter 50 can be scaled to indicate the value of $2D_2$ divided by the wave length corresponding to that frequency equal to the sum of the two frequencies $f_1$ and $f_2$, or even to $D_2$ directly. Assume the meter to read $D_2$ directly. This reading of the indicator will increase as the mobile station continues along a set path away from station A but should the mobile station reverse itself, the reading of the indicator will decrease. Therefore, the indicator will continuously operate in either direction to constantly and continuously indicate the distance between the mobile and the fixed station.

By use of suitable scales and gear trains, the constant in the equations could be compensated such that the phase meter would be made to read $D_2$ directly. However, in measuring the distance $D_2$ directly, it will be necessary that the mobile station start from station A or from some known position in which case the value of the starting distance will be initially inserted within the phase meter. Since the system is responsive only to the Doppler change in frequency and an integration with time is performed, a phase shift due to the travel time of a wave between transmitter and receiver will not affect the distance indication on the phase meter since this is a phase shift rather than a frequency change.

At fixed station B, a pair of radiant energy receivers 28 and 32, similar in construction to the receivers 20 and 24 of the remote station, are each selectively tuned to receive continuous wave frequencies $f_1$ and $f_2$, radiated from station A. The signals having frequencies $f_1$ and $f_2$ are picked up by antennae 26 and 30 of their respective receivers 28 and 32 and amplified in the receivers. The amplified output $f_1$ of the receiver 28 and the amplified output $f_2$ of receiver 32 are each fed into a separate input of a sum mixer 76 to produce in its output a signal having a continuous wave frequency of $f_1+f_2$. It should be noted that no frequency change is produced during the transmission of the signals from station A to station B since the stations A and B are both fixed relative to each other and in such a case, Doppler's principle does not apply. A receiver 44, similar in construction to the receivers 20 and 24 of the remote station, is selectively tuned to receive the radiated signal from the transmitter 38 of the remote station. This signal having a frequency of $f_1+f_2+\Delta f_1+\Delta f_2+\Delta f_3$ is amplified in the receiver 44 and applied to one input of a phase meter 78 which is of identical construction as the phase meter 50 described above, while the output signal of the mixer 76 which has a frequency $f_1+f_2$ is applied to the second input of the phase meter 78. It should be noted that the continuous wave signal received from the transmitter 38 by the receiver 42 will usually not be identical to the frequency received by the receiver 48 located at station A. This difference is due to the fact that the frequency shift due to the Doppler effect in a direction $D_3$ will usually be different from that along the direction $D_2$. $\Delta f_3$ is equal to the velocity in ft. per sec. of the mobile unit with respect to station B (that is, on a straight line through the mobile station to the station B, where the velocity is plus if the mobile unit is moving toward B and minus if moving away from B) divided by the wavelength in feet of frequency $f_1+f_2+\Delta f_1+\Delta f_2$.

By analogous mathematical calculations similar to that shown above in relation to the phase meter indications of station A, the reading of phase meter 78, referred to as $\phi_2$ is:

$$\phi_2 = \frac{D_2+D_3}{X_3}$$

By use of suitable scales and gearing, this phase meter can be made to read the distance $D_2+D_3$ directly. At station A, $D_2$ is known so that $D_3$ can be found by simple subtraction in accordance with the equation $$D_2+D_3-D_2=D_3$$

This subtraction can be accomplished, if desired, at a single station, as for example, station A, by transmitting the sum of $D_2$ and $D_3$ to station A. With the distance $D_2$ already known at station A, and the sum of $D_2$ and $D_3$ conveyed thereto, as for example by telephone, the position of the mobile station can be quickly determined at any time.

Figure 3:
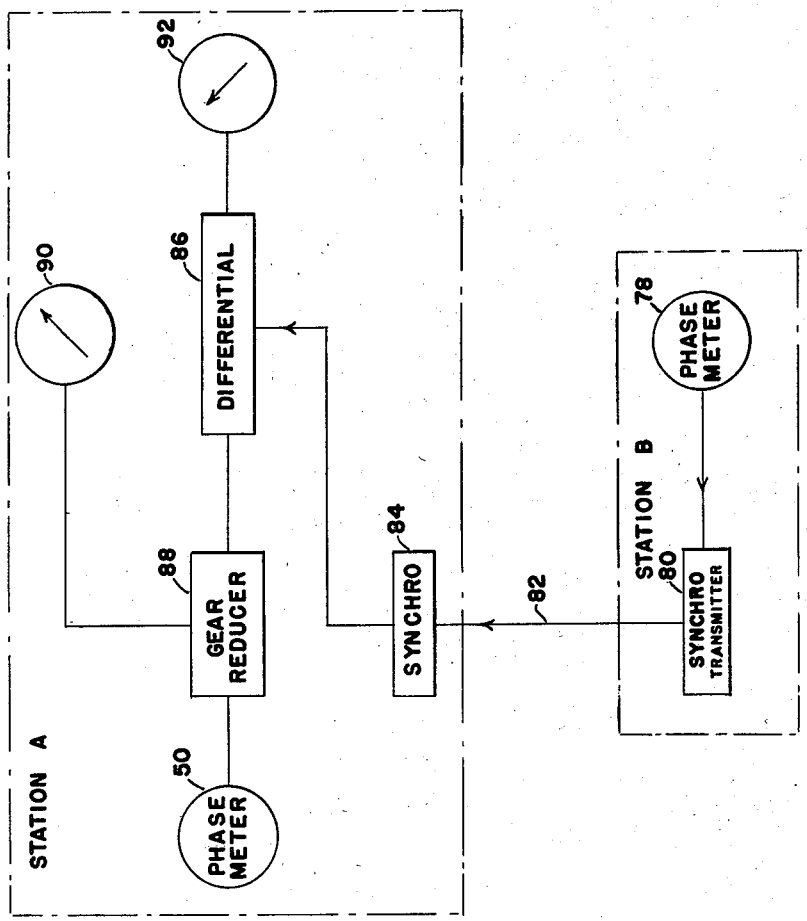
Fig. 3 is a block diagrammatic view of a telemetering system for transmitting the distance data between the fixed stations and for coordinating the distance data at a single station.

The subtraction can also be done automatically. Fig. 3 diagrammatically illustrates a system that can be utilized. Assume that the phase meter indication at station A is calibrated to indicate $2D_2$. At station B, the reading $D_2+D_3$ of the phase meter 78 is fed into a synchro transmitter 80 which transmitter relays the signal over an electrical conductor 82 to a synchro mechanism 84 located at the station A. The synchro mechanism 84 then applies the signal received to a differential unit 86. Directly connected to the phase meter 50 of station A is a gear reducer 88 having a 2:1 ratio such that an input value of $2D_2$ from the phase meter 50 will produce an output value of $D_2$ from the gear reducer. This signal output is fed directly to an indicator 90 and the differential unit 86. The differential unit resolves the input signal $D_2+D_3$ from the synchro mechanism 84 and the input $D_2$ from the gear reducer 88 to produce in its output thereof a value $D_3$ which is fed to an indicator 92. The indicators 90 and 92 will thus indicate the distances $D_2$ and $D_3$ directly.

From the direct reading of $D_2$ and $D_3$ and with the distance $D_1$ known, the exact location of the mobile unit can be determined and, if desired, plotted. By plotting a series of subsequent positions, the path of the mobile station can be determined.

The invention of Fig. 2 is not limited to a system having a single station such as station B, but additional such stations can be added for additional distance determinations without any alterations in the system.

Figure 4:
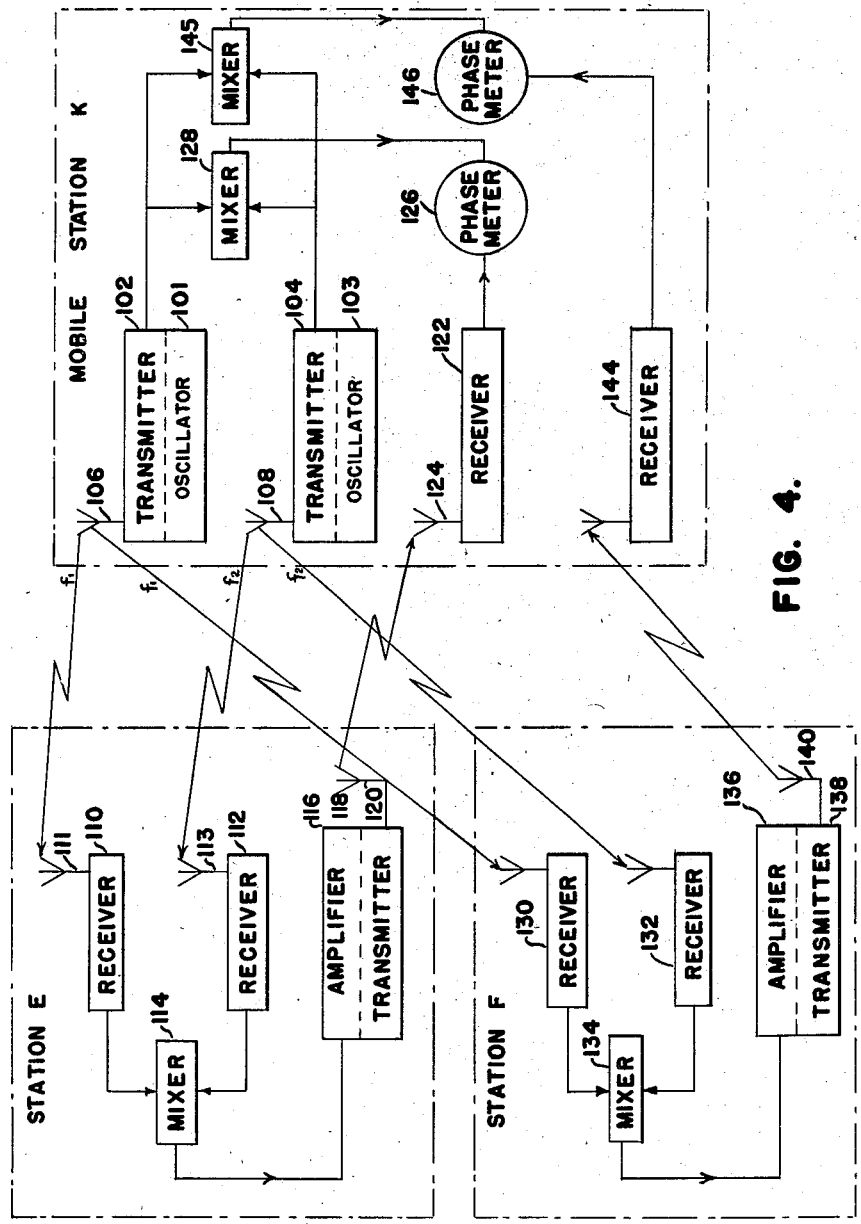
Fig. 4 is a block diagrammatic view of another embodiment of the invention for indicating at a mobile station the distance from a plurality of fixed stations.

In the embodiment of Fig. 2 the position and path of a mobile station is determined at one of a pair of fixed stations. Fig. 4 discloses an embodiment of the invention wherein a mobile unit may determine its own position relative to a pair of fixed stations. Consequently, each station, whether mobile or fixed, can be an observation station.

For observation at the mobile station in accordance with the invention, as shown in Fig. 4, a mobile station K is provided with a pair of continuous wave signal transmitting means, similar to those of station A of Fig. 2, including a pair of constant frequency local oscillators 101 and 103 of transmitters 102 and 104 and associated antennae 106 and 108. The local oscillators 101 and 103 of the transmitters generate signals having high continuous wave frequencies $f_1$ and $f_2$ respectively, which signals are radiated into space as radiant energy by transmitters 102 and 104 and their associated antennae 106 and 108.

At a remote fixed station E, a pair of selectively tuned radiant energy receivers 110 and 112 receive, through their respective antennae 111, 113, the radiated energy from the mobile station K. The received signal frequencies $f_1+\Delta f_1$ and $f_2+\Delta f_2$ are then fed to a sum mixer 114 where the frequencies are combined to produce at the output thereof, a continuous wave with a frequency $f_1+f_2+\Delta f_1+\Delta f_2$ equal to the sum of the two frequency inputs. This frequency is then amplified in an amplifier 116 and radiated into space by a transmitter 118 and its associated antenna 120. The station E with its receivers, mixer, amplifier and transmitter is similar in function and construction as the mobile station described above with relation to the embodiment of Fig. 2.

A receiver 122 at the station K is tuned to selectively receive the continuous wave signal radiated from antenna 120 of Station E through an antenna 124. The receiver 122 is similar in construction with the receivers 110 and 112 described above with the exception that the receiver 122 is selectively tuned to receive only the frequency transmitted from Station E. The amplified output signal which has a continuous wave frequency equal to $f_1+f_2+2\Delta f_1+2\Delta f_2$ in fed to one input of an integrating phase meter 126. At the transmitters 102 and 104, a portion of the generated frequencies $f_1$ and $f_2$ are tapped therefrom and applied to a sum mixer 128 where the two frequencies are combined to produce in the output thereof, a sum frequency $f_1+f_2$ which frequency is applied to the second input of the integrating phase meter 126 of similar construction as the phase meter 50. By analogous mathematics as explained above in relation to the modification of Fig. 2, it can be shown that the value indicated by the phase meter 126 will be equal to $$\frac{2D_2}{X_3}$$

where $X_3$ is the wave length of a frequency equal to the sum of the two frequencies $f_1$ and $f_2$. With suitable scales and gearing as explained above, the phase meter can be made to indicate the distance $D_2$ directly.

A pair of selectively tuned receivers 130 and 132, like those of receivers 110 and 112 of station E, are located in a remote fixed station F and are arranged to receive the respective signal frequencies $f_1$ and $f_2$ transmitted as radiant energy from the mobile station K. The received frequencies $f_1+\Delta f_1$ and $f_2+\Delta f_2$, which are amplified in the receivers 130 and 132, are applied respectively to the separate inputs of a difference mixer 134 similar to mixer 58 of the phase meter 50 which is operative to produce in its output thereof, the difference of the two input frequencies. This output frequency $$f_1 - f_2 + \Delta f_1 - \Delta f_2$$

is then amplified in an amplifier 136 and radiated into space by means of a transmitter 138 and antenna 140. The continuous wave frequencies in station F are subtracted rather than added to prevent any interference between the signal frequencies transmitted from the fixed stations E and F to the mobile station K. The continuous wave signal radiated from antenna 140 is received by a selectively tuned receiver 144 located within the mobile station whereby the received signal $f_1-f_2+2\Delta f_1 - \Delta f_2$ is amplified and fed into one input of an integrating phase meter 146. The receiver 144 and phase meter 146 are of similar construction as the receiver 122 and phase meter 126 with the exception that the receiver 144 is tuned specifically to receive the signal frequency transmitted by the transmitter 138. The second input of the phase meter 146 has applied thereto a continuous wave frequency $f_1-f_2$ obtained from the output of a difference mixer 145 similar in construction to the difference mixer 134. A difference mixer is employed to provide a basic frequency signal corresponding to the signal frequency received from the station F where the original received frequencies were subtracted rather than added. The inputs $f_1$ and $f_2$ of the difference mixer 145 are directly applied to the mixer from the transmitters 102 and 104. Again, by analogous mathematics similar to that explained above, it can be shown that the reading of the phase meter 146 will be equal to $$\frac{2D_3}{X_4}$$

where $X_4$ is equal to the wave length of a frequency wave having a frequency equal to the difference frequency $f_1-f_2$. With suitable scales and gearing mechanism the distance $D_3$ can be directly obtained and indicated.

Figure 5:
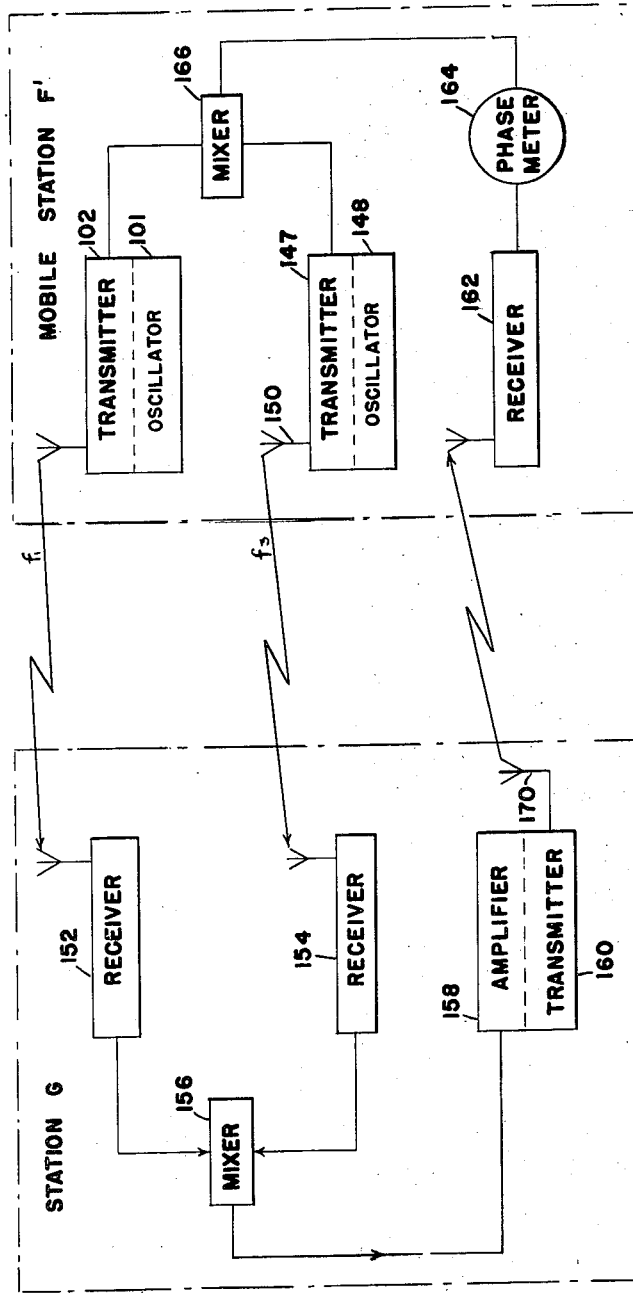
Fig. 5 is a block diagrammatic view of a system for incorporating additional fixed stations into the system.

Whenever it is desired that additional reference distances be obtained from an observing station to other points, the observing station can be modified as shown in Fig. 5. In this instance, a third high frequency continuous wave signal $f_3$ is generated at the mobile station by a third transmitter 147 having a constant frequency oscillator 148 and an associated antenna 150. The signal frequency $f_3$ is transmitted along with the signal frequency $f_1$ from the mobile station F' as radiant energy and is received by a pair of selectively tuned radio receivers 152 and 154 of a remote fixed station G. The received frequency waves $f_1+\Delta f_1$ and $f_3+\Delta f_3$ are combined in a sum mixer 156, amplified in an amplifier 158 and then transmitted by means of transmitter 160 and its antenna 170. At the mobile station F', the transmitted frequencies are received by a selectively tuned receiver 162 and applied to one input of an integrating phase meter 164. A portion of the continuous wave signals $f_1$ and $f_3$ are tapped from the transmitters 102 and 148 of the remote station F', fed to the two inputs of a sum mixer 166 where the signal having frequencies $f_1$ and $f_3$ are combined to produce a third frequency equal to the sum of the two input frequencies and then fed to a second input of the phase meter 164 whereby the distance between the station G and the station F' is indicated. The arrangement and individual components of the modification of Fig. 5 is generally similar to the arrangement of station A and the remote mobile station disclosed in Fig. 2.

The operation of the navigation system as shown in Fig. 5 is like the operation of the system as disclosed in the embodiment shown in Fig. 1. The distinction lies in the fact that with the use of an additional number of transmitters in the observing station and its accompanying comparing apparatus, i. e., mixers, receivers and phase meters, additional stations may be utilized to provide additional reference distances at the observing station. Thus, as disclosed in the embodiment shown in Fig. 5, the mobile station will obtain, through the indication of its phase meters, the distances between itself and the fixed stations A, B and G. Should additional distances be desired between a fixed station and a mobile station, additional frequencies may be employed in a manner illustrated and disclosed in the modification of Fig. 5.

In a successful experimental model constructed in accordance with the embodiment disclosed in Fig. 2, the following continuous wave frequencies were employed in stations A and the remote station:

Transmitter 8—3.141 megacycles
Transmitter 14—2.716 megacycles
Receiver 48—Tuned to a frequency of 5.85 megacycles
Receiver 20—Tuned to a frequency of 3.141 megacycles
Receiver 24—Tuned to a frequency of 2.716 megacycles From the above, it is evident that the applicant has provided an improved precision electronic navigation system capable of indicating the distances directly and continuously between an observing station and a fixed station whereby the position and the path of a mobile station can be quickly and accurately determined.

Furthermore, feedback between the transmission and reception apparatus is eliminated through the use of different frequencies for transmission and reception while interference susceptibility of the system is minimized by the use of narrow bandwidth tuned circuits associated with the continuous frequencies employed. Also, the accuracy of the system is improved through the use of high frequencies having short wave lengths which wave lengths may be accurately compared with a phase meter. It should be noted further that the accuracy is unaffected by any frequency drift of the basic frequencies since the frequency drift will affect each input of the phase meters equally.

Various modifications are contemplated and may obviously be resorted to by those skilled in the art without departing from the spirit and scope of the invention, as hereinafter defined by the appended claims, as only preferred embodiments thereof have been disclosed.

What is claimed and desired to be protected by Letters Patent of the United States is:

1. A method of continuously determining the position of a mobile station with reference to a first fixed station and a second fixed station comprising the steps of transmitting a plurality of continuous wave signals of different frequencies from the mobile station to said first and second fixed stations, receiving and combining said transmitted continuous wave signals at the first and second stations to produce a single resultant continuous wave signal at each of said fixed stations, transmitting said combined continuous wave signals to said mobile station from said first and second stations, combining said continuous wave signals as they appear prior to transmission at said mobile station to produce a single resultant continuous wave signal, and receiving and comparing at the mobile station the phase of said combined continuous wave signals from the first and second stations with the phase of the combined continuous wave signals as they appear prior to transmission to produce resultant indications of the distances between the mobile station and the first and second stations whereby the position of the moving station may be determined.

2. The method of continuously determining the position of a moving station with respect to a pair of fixed stations comprising the steps of transmitting a pair of continuous wave signals having different frequencies from a first fixed station to each of the other second mobile and third fixed stations, receiving and combining said transmitted continuous wave signals at each of the other stations to produce a single combined continuous wave signal at said second and third stations, transmitting said combined continuous wave signal from the second station to the said first and third stations, combining said continuous wave signals as they appear prior to transmission at said first station to produce a single resultant continuous wave signal, receiving and comparing at said third station the phase of the continuous wave signal from the second station with the phase of the combined continuous wave signal at the third station to produce a resultant indication of the distance between the said second station and the third station, receiving and comparing at the said first station the continuous wave signal from the said second station with the combined continuous wave signal at the first station to produce a resultant indication of the distance between the said first station and the said second station whereby the position of the moving station with respect to the pair of fixed stations may be determined.

3. A precision electronic navigation system for determining the position of a mobile station with respect to a pair of fixed stations comprising means for generating and transmitting a first continuous wave signal and a second continuous wave signal at a first station, sum mixer means to combine portions of the first and second generated continuous wave signals at the first station to produce a third continuous wave signal, means at a second mobile station to receive and combine said first and second continuous wave signals at said second station to produce a fourth continuous wave signal, means for transmitting into space the fourth continuous wave signal at said second station, means to receive and combine the first and second continuous wave signals at a third station to obtain said third continuous wave signal, means at said first and third stations to receive said fourth continuous wave signals, and phase comparator means for comparing the phase of the third and fourth continuous wave signals at the first and third stations to produce indications of the distances between the second mobile station and the first and third stations respectively whereby the position of the mobile station may be determined.

4. A precision electronic navigation system for determining the position of a mobile station with respect to a pair of fixed stations comprising means for generating and transmitting a first continuous wave signal and a second continuous wave signal from a first mobile station, means for combining a portion of the first and second continuous wave signals generated at the first station to obtain a third continuous wave signal, means to receive and combine said first and second continuous wave signals at a second and a third station to produce fourth and fifth continuous wave signals respectively, means to transmit said fourth and fifth continuous wave signals at the second and third stations respectively, means to receive the fourth and fifth continuous wave signals at the first station, and means for comparing the phase of the third with the fourth and fifth continuous wave signals at the first station to produce indications of the distances between the respective stations whereby the position of the moving station may be determined.

5. A method for continuously determining the distance between a pair of relatively moving stations comprising the steps of transmitting a first continuous wave signal and a second continuous wave signal from a first of said pair of stations, combining said first and second continuous wave signals at said first station to obtain a third continuous wave signal, receiving and combining said first and second continuous wave signals at the second of said pair of stations to produce a fourth continuous wave signal, transmitting said fourth continuous wave signal to said first station and receiving and comparing said fourth continuous wave signal with a signal at said first station to obtain an indication of the distance between the two stations.

6. A precision electronic navigation system for determining the distance between a plurality of relatively moving stations comprising a plurality of continuous wave signal generating and transmitting means at a first station for producing and transmitting a plurality of continuous wave signals, sum mixer means at said first station for combining said plurality of continuous wave signals to produce a first continuous wave resulting signal, receiving and mixing means at said second station for receiving and combining said transmitted continuous wave signals to produce a second continuous wave resulting signal, amplifying and transmitting means for said second continuous wave resulting signal at said second station, reception means at said first station for receiving said second continuous wave resulting signal transmitted from said second station, and a phase comparator means at said first station including a nulling means for phase comparing said first and second continuous wave resulting signals whereby an indication of the distance between said stations is obtained.

7. A precision electronic navigation system for determining the position of a moving object comprising a first station, a second mobile station and a third station, two of which are fixed means for transmitting from a first of said stations a pair of continuous wave signals having frequencies $f_1$ and $f_2$, means for receiving said frequencies $f_1$ and $f_2$ at said second and third stations, means for combining said received frequencies at each of said stations to produce a single frequency at each of said stations, means for transmitting said combined frequency at said second station, means for receiving said transmitted frequency from said second station at the first station and at the third station, and comparing means including an integrating phase meter at the first and third stations for comparing the combined frequency received from the second mobile station with the frequency produced by combining the frequencies $f_1$ and $f_2$ at the first and third stations, to produce indications of the distances between the stations whereby the position of the moving object may be determined.

8. A method for determining the position of a mobile station with respect to a pair of fixed stations comprising generating and transmitting a first continuous wave signal and a second continuous wave signal from a first mobile station, combining a portion of the first and second continuous wave signals generated at the first station to obtain a third continuous wave signal having a frequency which is the sum of the frequencies of the first and second continuous wave signals, and to obtain a fourth continuous wave signal having a frequency which is the difference of the frequencies of the first and second continuous wave signals, receiving and combining said first and second continuous wave signals at a second and a third station to produce a fifth and a sixth continuous wave signal respectively, transmitting said fifth and sixth continuous wave signals at the second and third stations respectively, receiving the fifth and sixth continuous wave signals at the first station, and comparing the phase of the third and fifth continuous wave signals at the first station and the fourth and sixth continuous wave signals at the first mobile station, to produce indications of the distances between the respective stations whereby the position of the mobile station may be determined.

9. A method for continuously determining the distance between a pair of relatively moving stations comprising the steps of transmitting a first continuous wave signal of fixed frequency and a second continuous wave signal of fixed frequency from a first of said pair of stations, combining said first and second continuous wave signals at said first station to obtain a third continuous wave signal of fixed frequency, receiving said first and second continuous wave signals at the second of said pair of stations at frequencies consisting of the corresponding fixed frequencies changed in accordance with the Doppler effect thereon resulting from the relative movement of said pair of stations, combining said received signals at said second station to produce a fourth continuous wave signal of a frequency dependent upon the frequencies of the signals transmitted from said first station and the Doppler effect on each of them as received at said second station, transmitting said fourth continuous wave signal back to said first station, and combining said third and fourth continuous wave signals to obtain a phase comparison indicative of the distance between the two stations.

References Cited in the file of this patent

UNITED STATES PATENTS

| | | |
|---|---|---|
| 2,148,267 | Honore | Feb. 21, 1939 |
| 2,198,113 | Holmes | Apr. 23, 1940 |
| 2,248,727 | Strobel | July 8, 1941 |
| 2,470,787 | Nosker | May 24, 1949 |
| 2,528,141 | Hastings | Oct. 31, 1950 |
| 2,611,127 | Palmer | Sept. 16, 1952 |
| 2,625,558 | Hawkins | Sept. 15, 1953 |